United States Patent Office 3,565,572
Patented Feb. 23, 1971

3,565,572
PROCESS FOR THE DYEING OF SHAPED ARTICLES MADE OF POLYACRYLONITRILE
Joachim Schneider, Krefeld-Urdingen, Werner Langmann, Cologne-Flittard, and Hans Rudolph, Krefeld-Bockum, Germany, assignors to Farbenfabriken Bayer Aktiengesellschaft, Leverkusen, Germany, a corporation of Germany
No Drawing. Filed Nov. 9, 1967, Ser. No. 681,922
Claims priority, application Germany, Nov. 16, 1966, F 50,691; Mar. 2, 1967, F 51,694
Int. Cl. D06p 5/04
U.S. Cl. 8—171                              3 Claims

ABSTRACT OF THE DISCLOSURE

Process for dyeing polyacrylonitrile containing materials with basic dyestuffs wherein the dyeing is carried out in the presence of compounds of the formula

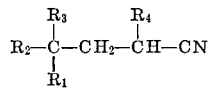

wherein $R_1$, $R_2$, and $R_3$ independently of one another are hydrogen, electron-attracting groups, alkyl, cycloalkyl, aryl, or

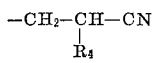

$R_4$ is hydrogen, $CH_3$— or —$CH_2CH_2CN$; and wherein two of the radicals $R_1$, $R_2$ or $R_3$ may be combined to form a cycloalkyl ring with the proviso that at least one of the radicals $R_1$, $R_2$, or $R_3$ is an electron-attracting group; and is followed by thermal aftertreatment. The process can also be carried out in the presence of phosphorous compounds of the formula

wherein X, Y and Z, independently of one another are optionally substituted alkyl, aryl, aralkyl, alkoxy, aroxy and/or aralkoxy radicals and two of the substituents X, Y and Z may also form a heterocyclic five- or six-membered ring with the phosphorous atom.

DISCLOSURE

The present invention relates to a process for dyeing shaped articles made of polyacrylonitrile and acrylonitrile-containing copolymers with basic dyestuffs. More particularly it concerns a process wherein the dyeing is carried out in the presence of cyano group-containing compounds of the general formula

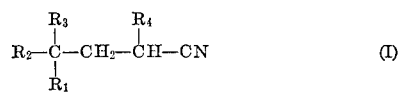    (I)

in which $R_1$, $R_2$ and $R_3$, independently of one another, stand for hydrogen, for electron-attracting groups, for alkyl, cycloalkyl or aryl groups or for the radical

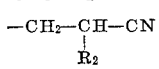

wherein $R_4$ denotes hydrogen, a methyl group or the radical —$CH_2$—$CH_2$—$CN$, and in which two of the radicals $R_1$, $R_2$ or $R_3$ may be combined to form a cycloalkyl ring with the proviso that at least one of the radicals $R_1$, $R_2$ or $R_3$ represents an electron-attracting group and is followed by a thermal aftertreatment.

Electron-attracting groups are, in this case, particularly the formyl group and alkyl-carbonyl, alkoxy-carbonyl, cyano, alkyl-sulphonyl, aryl-sulphonyl or nitro groups.

Compounds of the general Formula I are readily obtainable. Thus, for example, compounds of the formula

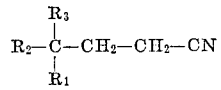

in which $R_1$, $R_2$ and $R_3$ have the same meaning as above, can readily be obtained by the reaction of C—H-active compounds with acrylonitrile according to "Organic Reactions," volume 5, pages 98–107.

Examples of C—H-active compounds include the following: propionaldehyde, butyraldehyde, isobutyraldehyde, acetone, methyl ethyl ketone, diethyl ketone, cyclohexanone, acetyl acetone, acetoacetic acid ester, malonic ester, cyanoacetic acid ester, malodinitrile, benzyl cyanide, nitromethane, nitroethane, 1-nitropropane, and 2-nitropropane.

The cyanoethylation products of the C—H-active compounds may be further reacted, for example, the ester group-containing products can be transesterified or they may be converted into the corresponding amides with mono- and polyamines.

Alternatively, it is also possible to subject part of the cyano groups present in the molecule to a further reaction. For example, they can be hydrolised to give amide or carboxyl groups.

Suitable copolymers containing acrylonitrile are, for example, those with vinyl chloride, vinylidene chloride, vinyl fluoride, vinyl acetate, vinyl chloroacetate, vinyl alcohol, acrylic and methacrylic acid, acrylic and methacrylic acid esters, allyl chloroacetate or with basic vinyl compounds, for example, vinyl-imidazole, vinyl-benzimidazole, vinyl-pyridine, vinyl-pyrimidine or vinyl-methylpyridine, provided that the proportion of these comonomers is not more than 20% by weight of the combined amount of the acrylonitrile and the comonomers. The process is also applicable to mixed fibres or spun yarns consisting of polyacrylonitrile or acrylonitrile-containing copolymers and other fibres, such as wool or polyamide.

The materials to be dyed may be present, for example, as cable sheathings, filaments, flocks, combed materials, yarns, fabrics, knitted fabrics or ribbons.

As basic dyestuffs which can be used for the process according to the invention a great variety of classes of compounds come into consideration, for example, diphenyl-methane, triphenyl-methane and rhodamine dyestuffs, onium group-containing azo or anthraquinone dyestuffs, furthermore triazine, oxazine, methine and azomethine dyestuffs.

Expedient proportions between the basic dyestuffs and the compounds of the Formula I to be used according to the invention can readily be determined by preliminary experiments. In general, amounts of about 20–200%, referred to the weight of the basic dyestuffs used have proved to be suitable.

The compounds of the Formula I may be dissolved before being used, or they may be dispersed by the addition of surface-active compounds, preferably nonionic compounds. Nonionic dispersing agents are primarily polyglycol ethers, for example, the reaction products of 6–20 mol ethylene oxide with 1 mol of a fatty alcohol, a fatty amine, a fatty acid, a fatty acid amide, or an alkyl-phenol containing an aliphatic hydrocarbon radical with 8–18 carbon atoms. The proportion by weight between the surface-active polyglycol ethers, on the one hand, and the substances to be used according to the invention, on the other hand, is expediently 0.5–1.5:1.

The compounds of the Formula I can be used by themselves or in combination with conventional auxiliaries, such as carboxylic acid amides and/or surface-active compounds.

The pH value of the liquor lies expediently between 2.5 and 6.5. It is also advisable to add to the impregnating liquor a thickening agent, e.g., etherified carob bean flour or British gum.

The dyeing can be carried out by impregnating the shaped articles on a foulard, by spraying, coating or printing. The dyeing is followed by a thermal after-treatment which can be performed by steaming with neutral saturated steam at 100° C. for 10 to 30 minutes, by steaming with neutral saturated steam at 125–130° C. for 2–3 minutes, or by thermosolation, i.e., by heating at temperatures of 180–200° C. for 20–90 seconds.

With the concurrent use of the afore-mentioned cyano group-containing compounds in padding solutions or printing pastes, the basic dyestuffs exhibit a substantially improved affinity. They also yield more brilliant shades as well as substantially increased depth of colour of the dyeings and prints obtained on polyacrylonitrile or acrylonitrile copolymers so that dyeing under increased pressure or subsequent steaming of the printed fabrics under increased pressure, which is otherwise always necessary to achieve sufficient depth of colour, can be dispensed with or can be considerably shortened. These improvements are especially important for the long filaments consisting of the aforesaid materials, which, in comparison with the corresponding staple fibres, are substantially more difficult to dye. While the manufacture is considerably simpler and gentler, the dyeings and prints produced in this way exhibit the same fastness properties as the dyeings and prints obtained in the usual manner without the concurrent use of cyano group-containing compounds of the Formula I.

With the concurrent use of compounds of the Formula I, higher dyestuff yields are obtained than with the use of the compounds already used for the same purpose which contain cyano groups linked to nitrogen via alkylene groups, e.g., N,N-bis-(β-cyanoethyl)-formamide. In addition, those compounds to be used according to the invention which are derivates of acetoacetic acid are distinguished by an increased levelling power.

A special method of carrying out the process of the present invention consists in using in addition to the cyano group-containing compounds of the Formula I phosphorus compounds of the formula

   (II)

in which X, Y and Z, independently of one another, denote an alkyl, aryl, aralkyl, alkoxy, aroxy and/or aralkoxy radical which may be substituted, for example, by halogen, cyano or amino groups, and in which two of the substituents X, Y and Z may form a five- or six-membered ring with the phosphorus atom.

Examples of phosphorus compounds of the general Formula II include the following: phosphine oxides, such as tributyl-phosphine oxide or diethylphenyl-phosine oxide; further phospholines, such as 1-oxo-1-ethyl-3-methyl-phospholine-3,
1-oxo-1-methoxy-phospholine-3,
1-oxo-1-ethoxy-phospholine-3,
1-oxo-1-butoxy-phospholine-3,
1-oxo-1-stearoxy-phospholine-3,
1-oxo-1-(β-chloropropoxy)-phospholine-3 or
1-oxo-1-methoxy-3-chloro-phospholine-3;

furthermore, phosphonic acid esters, such as methanephosphonic acid dimethyl ester, benzene-phosphonic acid dimethyl ester or β-cyanoethane-phosphonic acid dimethyl ester or -dibutyl ester; and, finally, phosphoric acid esters, such as triethyl phosphate, tributyl phosphate or diphenyloctyl phosphate.

The optimum proportions between the basic dyestuffs, on the one hand, and the compounds of the Formulae I and II, on the other hand, can easily be determined by preliminary experiments; in general, the compounds (I) and (II) are used in a total amount of 20–200%, referred to the weight of the basic dyestuffs.

The optimum proportions between the compounds (I) and (II) may vary within wide limits and can be easily determined by preliminary experiments; in general, proportions by weight of 0.2–1.5:1 have proved to be suitable.

By the additional concurrent use of phosphorus compounds of Formula II the cyano group-containing compounds of Formula I are more rapidly and homogeneously dispersed or dissolved in the dyebath. Moreover increased dyestuff yields are obtained.

The parts given in the following examples are parts by weight; the numbers of the dyestuffs refer to the data in Colour Index, vol. 3, 2nd edition.

EXAMPLE 1

A combed material of polyacrylonitrile is impregnated with an aqueous liquor of 50 parts of the dyestuff C.I. No. 51005, 25 parts of the reaction product of α,α-dicyanoethyl-acetoacetic acid ethyl ester with ethanolamine, and 120 parts of a commercial thickening agent based on carob bean flour with a solids content of 5%, and 805 parts of water. The combed material is subsequently squeezed to a weight increase of 90% and steamed with saturated steam at a temperature of 102° C. for 20 minutes. The material is then rinsed with water and dried. The combed material is then dyed in a deep blue shade.

The above-mentioned ethanolamine reaction product was obtained by heating 500 parts α,α-dicyanoethyl-acetoacetic acid ethyl ester and 200 parts ethanolamine at 120° C. for 3 hours and subsequently removing the volatile components by vacuum distillation at 130° C./0.5 mm. Hg.

EXAMPLE 2

The process is carried out according to the instructions of Example 1, but a liquor is used which, instead of the dyestuff there mentioned, contains 30 parts of the dyestuff C.I. No. 48013 and, instead of the reaction product there mentioned, contains 15 parts of the reaction product of 1 mol nitroethane with 2 mol acrylonitrile, which was dispersed with 5 parts of the reaction product of 20 mols ethylene oxide with 1 part oleyl alcohol. A deep violet dyeing is obtained.

EXAMPLE 3

A fabric of polyacrylonitrile is impregnated on the foulard with an aqueous liquor prepared from 30 parts of the dyestuff C.I. No. 48020, 15 parts of the product obtained by reacting acetoacetic acid ethyl ester with acrylonitrile in a molar ratio 1:2, 120 parts of the commercial thickening agent used in Example 1 and 835 parts of water. After squeezing the fabric to an increase in wet weight of 100%, the fabric is treated for 20 minutes with neutral saturated steam at 103° C., then rinsed with water and subsequently dried.

The fabric is then dyed in a level red shade; the dyeing possesses good fastness properties.

EXAMPLE 4

A liquor is prepared which contains 50 parts of the dyestuff C.I. No. 48040, 25 parts of the condensation product of α,α-dicyanoethyl-acetoacetic acid ethyl ester and ethylene-diamine, 120 parts of the commercial thickening agent used in Example 1, 10 parts of the reaction product of 10 mol ethylene oxide with one mol nonylphenol, and 795 parts of water. This liquor serves for impregnating an E-ribbon of polyacrylonitrile (acrylic tow). The increase in wet weight amounts to 90%. The E-ribbon is passed through a continuously operating steamer and the speed is adjusted in such a manner that the material is subjected for 15 minutes to a saturated steam atmosphere at a temperature of 103° C. The material is subsequently washed and dried. The ribbon is thereafter dyed in a brilliant orange shade.

The aforesaid condensation product was prepared in the following manner: 500 parts α,α-dicyanoethyl-acetoacetic acid ethyl ester and 70 parts ethylene-diamine were heated at 120–125° C. for 3 hours. The volatile components were subsequently removed by vacuum distillation at 130° C/0.5 mm. Hg.

EXAMPLE 5

A combed material of polyacrylonitrie is impregnated with an aqueous liquor consisting of 50 parts of the dyestuff C.I. No. 51005, 10 parts of the reaction product of α,α-dicyanoethyl-acetoacetic acid ethyl ester with ethanolamine used in Example 1, 10 parts of β-cyanoethane phosphonic acid dimethyl ester, 10 parts of the addition product of 10 mols ethylene oxide on to 1 mol nonyl phenol, 120 parts of the commercial thickening agent used in Example 1 and 200 parts of water. The combed material is subsequently squeezed to a weight increase of 90% and steamed for 10 minutes with saturated steam at a temperature of 102° C. The material is then rinsed with water and dried. A deep level blue dyeing is obtained.

The β-cyanoethane-phosphonic acid dimethyl ester was prepared as follows:

A mixture of 1245 parts dimethyl phosphite and 600 parts of freshly distilled acrylonitrile was slowly treated, while stirring, with a solution of sodium methylate in methanol prepared from 8.6 parts sodium and 100 parts methanol. The reaction mixture was subsequently heated at 60–70° C. for about 30 minutes. The resultant β-cyanoethane-phosphonic acid dimethyl ester was then purified by fractional distillation (B.P. 160° C./10 mm. Hg).

EXAMPLE 6

A fabric of polyacrylonitrile is impregnated on a foulard with a liquor consisting of 30 parts of the dyestuff C.I. No. 48020, 10 parts of 1-oxo-1-butoxy-phospholine-3, 10 parts of the reaction product of 1 mol 2-nitropropane with 1 mol acrylonitrile, 10 parts of the addition product of 10 mols ethylene oxide on to 1 mol nonylphenol, 120 parts of the thickening agent used in Example 1 and 820 parts of water.

After impregnation, the fabric is squeezed to a wet weight increase of 100%, treated for 10 minutes with neutral saturated steam at 103° C., then rinsed with water and dried. A deep bluish red dyeing is obtained.

The 1-oxo-1-butoxy-phospholine-3 was prepared as follows:

117.7 parts 1-oxo-1-chloro-phospholine-3, obtained by the reaction of phosphorus pentachloride with 1-oxo-1-(α-methyl-β-chloroethoxy)-phospholine-3 according to the instructions given in Journal of the General Chemistry of the U.S.S.R. in English Translation, vol. 33, p. 775 (1963), were slowly added to 400 parts n-butanol while keeping the temperature of the reaction mixture at 0 to −5° C. by cooling. When the reaction was completed, the reaction mixture was treated at 0° C. with a suspension of 76 parts sodium hydrogen carbonate in 200 parts of water and subsequently extracted with methylene chloride. The methylene chloride was then evaporated together with the excess butanol, and the resultant 1-oxo-1-butoxy-phospholine-3 was purified by fractional distillation (B.P. 84° C./1 mm. Hg).

We claim:
1. A process for dyeing shaped articles of polyacrylonitrile or acrylonitrile copolymers containing at least 80% by weight of acrylonitrile with basic dyestuffs, wherein the dyeing is carried out in the presence of cyano group-containing compounds of the formula

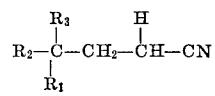

in which $R_1$, $R_2$ and $R_3$, independently of one another are hydrogen, alkyl with 1–3 carbon atoms, cyclohexyl, phenyl, a radical

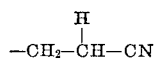

or an electron-attracting group selected from the group consisting of formyl, alkylcarbonyl, alkoxycarbonyl, cyano, alkylsulfonyl, arylsulfonyl, or nitro, and in which two of the radicals $R_1$, $R_2$ or $R_3$ may be combined to form a cyclohexyl ring with the proviso that at least one of the radicals $R_1$, $R_2$ or $R_3$ represents a said electron-attracting group, and in which the dyeing is followed by thermal aftertreatment.

2. The process of claim 1 wherein the dyeing is carried out in the presence of and in addition to the cyano group-containing compounds of the formula given, phosphorus compounds of the general formula

in which X, Y and Z, independently of one another, are alkyl having 1 to 8 carbon atoms, phenyl, alkoxy with 1–18 carbon atoms, phenoxy, substituted alkyl having 1–8 carbon atoms, substituted phenyl, substituted alkoxy having 1–18 carbon atoms, substituted phenoxy wherein the substituents are halogen, cyano or amino and wherein two of the substituents X, Y and Z may also form a phospholino radical.

3. Shaped articles of polyacrylonitrile or acrylonitrile copolymers containing at least 80% by weight of acrylonitrile dyed by the process of claim 1.

References Cited

UNITED STATES PATENTS

| | | | |
|---|---|---|---|
| 2,762,832 | 9/1956 | Heckert | 8—177X |
| 2,859,086 | 11/1958 | Feild et al. | 8—171 |
| 3,051,736 | 8/1962 | Horn | 8—177X |
| 3,253,877 | 5/1966 | Straley et al. | 8—171X |
| 3,277,103 | 10/1966 | Trofimenko | 8—177X |
| 3,416,877 | 12/1968 | Gantz et al. | 8—171 |

GEORGE F. LESMES, Primary Examiner

T. J. HERBERT, Jr., Assistant Examiner

U.S. Cl. X.R.

8—172, 177

UNITED STATES PATENT OFFICE
CERTIFICATE OF CORRECTION

Patent No. 3,565,572                    Dated Feb. 23, 1971

Inventor(s) Schneider, Joachim et al.

It is certified that error appears in the above-identified patent and that said Letters Patent are hereby corrected as shown below:

| COLUMN | LINE | ERROR |
| --- | --- | --- |
| 1 | 65 | "$R_2$" should be ---$R_4$---. |

Signed and sealed this 23rd day of November 1971.

(SEAL)
Attest:

EDWARD M. FLETCHER, JR.              ROBERT GOTTSCHALK
Attesting Officer                    Acting Commissioner of Paten